United States Patent [19]
Roll et al.

[11] Patent Number: 5,344,163
[45] Date of Patent: Sep. 6, 1994

[54] DYNAMIC SHAFT SEAL FOR PUMPING FIBROUS SLURRIES

[75] Inventors: Daniel R. Roll, Seneca Falls; George Wilson, Skaneateles, both of N.Y.

[73] Assignee: Goulds Pumps, Incorporated, Seneca Falls, N.Y.

[21] Appl. No.: 952,290

[22] Filed: Sep. 28, 1992

[51] Int. Cl.⁵ ............................................. F16J 15/44
[52] U.S. Cl. .................................... 277/67; 277/133; 415/171.1
[58] Field of Search ............................. 277/13–14 V, 277/18, 67, 68, 69, 133, 134; 415/171.1

[56] References Cited

U.S. PATENT DOCUMENTS

| | | | |
|---|---|---|---|
| 2,136,799 | 11/1938 | MacLean | 277/13 |
| 2,153,537 | 4/1939 | Heath et al. | 277/67 X |
| 3,040,670 | 6/1962 | Schenck et al. | 415/171.1 X |
| 4,466,619 | 8/1984 | Adams | 277/65 X |
| 4,466,772 | 8/1984 | Okappu et al. | 415/171.1 X |
| 4,545,586 | 10/1985 | von Pragenau | 277/53 |
| 4,576,383 | 3/1986 | Ballard | 277/53 |
| 4,685,684 | 8/1987 | Ballard | 277/68 X |
| 4,884,945 | 12/1989 | Boutin et al. | 277/96.1 X |
| 5,158,304 | 10/1992 | Orlowski | 277/67 X |
| 5,217,234 | 6/1993 | Hornsby | 277/67 |

FOREIGN PATENT DOCUMENTS 248273 10/1910 Fed. Rep. of Germany ...... 277/133

*Primary Examiner*—William A. Cuchlinski, Jr.
*Assistant Examiner*—Scott W. Cummings
*Attorney, Agent, or Firm*—Brezina & Ehrlich

[57] ABSTRACT

A dynamic shaft seal for a fluid handling apparatus for pumping fibrous slurries, the fluid handling apparatus comprising an impeller mounted on a rotating shaft disposed in a pump housing, the shaft extending through an aperture extending from the pump housing into an impeller casing forming part of the pump housing. Prime mover means rotate the shaft. A slurry of a dispersed fibrous material in a fluid is disposed in the impeller casing, and a repeller chamber is formed in the pump housing in proximity to the aperture and in communication with the impeller casing. A repeller attached for rotation with the shaft extends into the repeller chamber to force a portion of the fluid in the impeller casing to move in a vortex in a direction away from the aperture. The invention includes means associated with the repeller to apply shear forces to the fluid vortex, and create circulatory flow within the vortex to maintain the dispersion of the fibrous material in the slurry.

10 Claims, 3 Drawing Sheets

DYNAMIC SHAFT SEAL FOR PUMPING FIBROUS SLURRIES

FIELD OF THE INVENTION

The present invention relates generally to a centrifugal pumping apparatus for handling fibrous slurries, and more particularly, to a device for sealing about the circumference of a rotating shaft of a centrifugal pump which prevents dewatering of the fibrous slurry and the plugging of a sealing chamber within the pump.

BACKGROUND OF THE INVENTION

Centrifugal pumping apparatuses are widely used for pumping liquids. The centrifugal pump typically includes an impeller which is connected to one end of a rotary shaft which is rotatably driven by an electric motor, steam turbine, or other prime mover. The impeller is housed within an impeller casing. Fluid entering the casing at the center of the impeller is radially displaced and pressurized by the rotating impeller. The pressurized fluid then exits the casing via an outlet located along the periphery of the casing. Connected to the casing is a pump housing having a bearing housing that rotatably supports the rotary shaft extending through an aperture between the pump housing and the impeller casing.

Fluid pumped within the impeller casing must be prevented from flowing rearward along the rotating shaft, through the aperture between the pump housing and impeller casing, toward the motor and leaking into the environment. The sealing about the rotating shaft in a centrifugal pump is frequently accomplished with dynamic seals, compressive stuffing or mechanical seals. The stuffing or seal is inserted in a stuffing chamber or box formed between the shaft and the pump housing rearward of the impeller.

When the pump is handling clear liquids, fibrous slurries, liquids with suspended solids and other fluids, a dynamic seal is frequently used to seal about the rotating shaft. A repeller is housed in a repeller chamber formed between the pump housing forward of the stuffing box and a backplate inserted between the impeller casing and pump housing. The repeller chamber is in communication with the fluid in the impeller casing.

The repeller is rotatably attached to the shaft and includes a radial disk with a smooth forward surface facing the backplate, and a number of radially extending vanes integrally attached to the rearward surface of the disk. As the fluid is pumped through the impeller casing, the fluid enters the repeller chamber and travels radially outward between the backplate and the smooth surface of the rotating disk. Due to the viscous drag between the smooth surface of the rotating disk and fluid, a vortex is formed in the fluid between the disk and backplate.

As the fluid begins to migrate radially inward along the rearward surface of the disk, the pumping action of the rotating vanes creates a pressure rise in the fluid which prevents the fluid from reaching the shaft.

One of the drawbacks of the use of prior repellers is that when the fluid contains dispersed solid material such as a fibrous slurry which has a fiber content of about 3.0% or greater, depending upon the type of slurry, the centrifugal forces in the vortex and the specific gravity of the fibers cause the dispersed fibers in the slurry to begin to clot in the repeller chamber about the repeller. This clotting is known as dewatering of the slurry, and the dewatered slurry interferes with the action of the pump. Previously, passing liquid through or flushing of the repeller chamber was required to remove the clot of fibers in the slurry, thereby causing auxiliary equipment to be included with the pump.

Therefore, it is a primary object of the present invention to provide a repeller and repeller chamber for a centrifugal pumping apparatus for handling fibrous slurries which applies shear forces to the fluid vortex created by the repeller action to create circulatory flow within the vortex and maintain the dispersion of the fibrous material in the slurry.

Another object of the present invention is to provide a repeller and repeller chamber for a centrifugal pumping apparatus for handling fibrous slurries which includes scalloped indentations in the circumference of a radial disk forming the repeller wherein the scalloped indentations, and the degree of linear depth of the scalloped indentations, create shear forces in the vortex formed in the fluid passing between the repeller and the repeller chamber to prevent dewatering of the fibrous material and to prevent plugging of the repeller or repeller chamber by the fibrous material.

A further object of the present invention is to provide a repeller and repeller chamber for a centrifugal pumping apparatus for handling fibrous slurries which include a plurality of inwardly extending stationary radial vanes spaced around the annular surface of the repeller chamber, and the dimensional relationship between the stationary radial vanes of the repeller chamber and the radial extent of the vanes formed on the repeller creates shear forces in the fluid vortex in the repeller chamber.

Another object of the present invention is to provide a repeller and a repeller chamber in a centrifugal pump for handling fibrous slurries which includes the presence of recirculation zones disposed between the repeller chamber annular surface and the repeller to provide acceleration of the fluid flow at the upstream side of stationary ribs found in the repeller chamber, thereby creating shear forces in the vortex within the repeller chamber.

SUMMARY OF THE INVENTION

These and other objects are provided in a dynamic shaft seal device for a fluid handling apparatus for pumping liquids containing dispersed solids such as fibrous slurries. The fluid handling apparatus comprises an impeller mounted on a rotatory shaft which extends from a pump housing through an aperture and into an impeller casing forming part of the pump housing. A prime mover rotates the shaft and the impeller to pressurize and pump a slurry of dispersed fibrous fluid disposed in the impeller casing.

A repeller chamber is formed in the pump housing adjacent the shaft aperture and communicates with the fluid in the impeller casing, and a repeller extends radially into the repeller chamber. The repeller chamber is formed between a stuffing box cover and a backplate, both of which form part of the pump housing. As the repeller rotates, a vortex is formed in the fluid in the repeller chamber, which vortex moves the fluid in a direction away from the aperture through which the shaft extends into the impeller casing.

To inhibit dewatering and prevent plugging of the repeller or repeller chamber when fibrous slurries are being pumped through the impeller casing, the present invention provides several elements to create shear forces and produce circulatory flow in the otherwise uniform vortex in the repeller chamber. These elements include fixed vanes extending inward from the annular surface of the repeller chamber, scalloped indentations in the circumferential surface of the rotating repeller singularly and in combination with the fixed vanes and radial vanes on the rearward face of the rotating repeller in combination with the fixed vanes. By maintaining a prescribed clearance range between the outer circumferential surface of the repeller and the inner circumferential extent of the fixed vanes and a prescribed clearance range between the repeller and annular surface of the repeller chamber, the applied shear forces form zones of circulation between the repeller and the annular surface of the repeller chamber. The shear forces and circulation zones mix the slurry fluid within the vortex which inhibits the dewatering of the dispersed solid materials in the slurry and prevents plugging of the repeller or repeller chamber.

BRIEF DESCRIPTION OF THE DRAWINGS

The above stated objects of the present inventions will best be understood with reference to the detailed description of the preferred embodiment, read in conjunction with the drawings wherein.

DESCRIPTION OF THE PREFERRED EMBODIMENT

Figure 1:
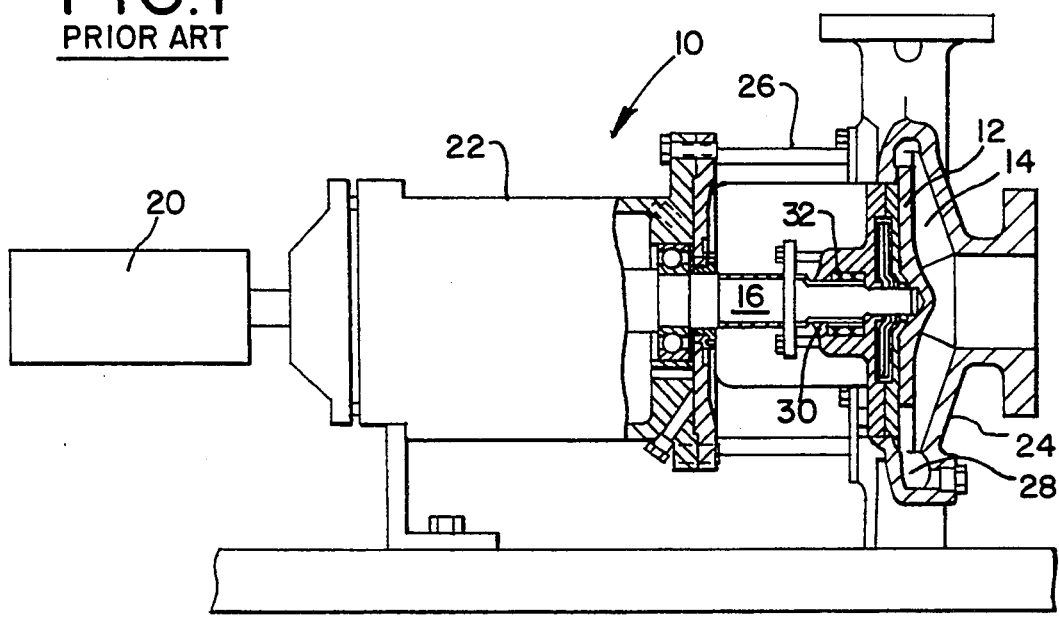
FIG. 1 is an elevation, partial sectional view of a centrifugal pumping apparatus of the type used to pump fibrous slurries.
Figure 2:
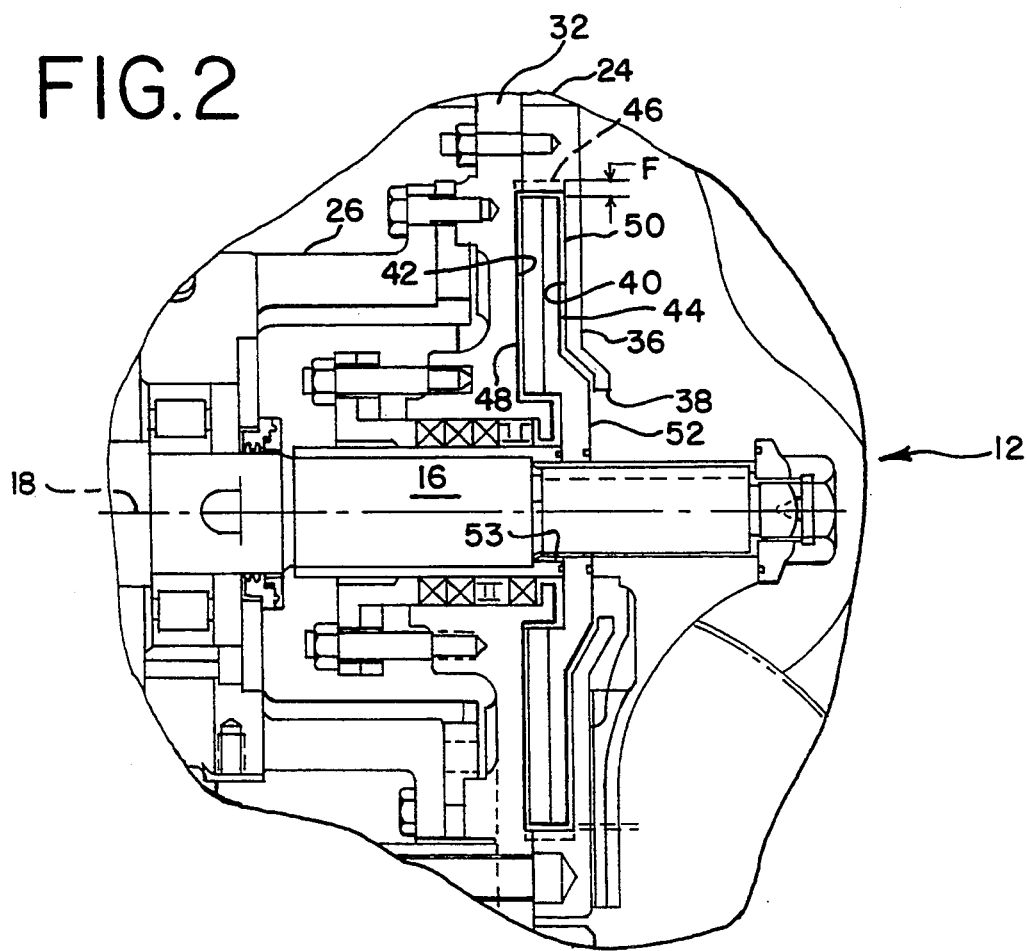
FIG. 2 is a cross-sectional elevation view of the pump apparatus for a fibrous slurry of the present invention, showing the novel repeller and repeller chamber structure.

Referring to FIG. 1, a centrifugal pumping system is illustrated generally at 10. The centrifugal pump 10 includes a rotating impeller 12 having spirally arranged vanes 14. Fixedly attached to the impeller 12 is a rotary shaft 16 having a centerline which defines a longitudinal axis 18 (FIG. 2). Operationally connected to the rearward end of the shaft 16 opposite the impeller 12 is a prime mover apparatus which is preferably an electric motor 20 but can also be other devices such as a steam turbine. It is readily seen that the rotational movement supplied by the motor 20 operationally drives the impeller about the longitudinal axis 18. The direction of rotation of the impeller and repeller is indicated by A in FIG. 8.

Referring to FIG. 2, the pump body indicated generally at 22 includes an impeller casing 24 which is attached to a rearward pump housing 26. The impeller 12 rotates within impeller cavity 28 defined by the casing 24 and pump housing 26. As is well known, fluid enters the cavity 28 at the center of the impeller 12 and the rotating vanes 14 drive the fluid toward the periphery of the cavity which pressurizes the fluid. The pressurized fluid then exits the cavity 28.

At the rear of the pump body 22 is a bearing housing 30 which rotatably supports the shaft 16. The pump body 22 also includes a stuffing box 32 located intermediate the bearing housing 28 and casing 24.

Referring to FIG. 2, a backplate 36 is removably attached to the stuffing box 32 between the stuffing box and impeller 12. The backplate 36 has a circular inner periphery which forms a forward aperture 38. The rotary shaft 16, a rearward face 40 of the backplate 36 and a forward face 42 of the stuffing box 32 define a repeller chamber 44. The repeller chamber 44 has an annular or circumferential outer surface 46 concentrically disposed about the shaft 16, a rear-ward surface 48 formed by a portion of the forward face 42 of the stuffing box 32 and a forward surface 50 formed by a portion of the rearward face 40 of backplate 36.

Figure 6:
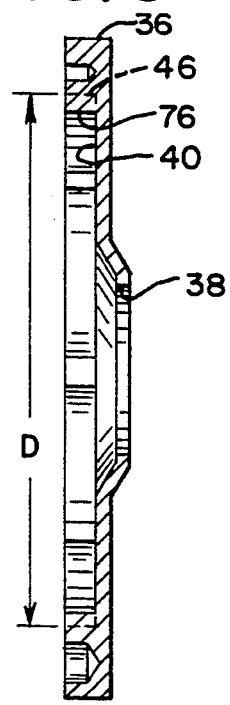
FIG. 6 is side cross-sectional view of the backplate of FIG. 4, taken along the line 6—6.

The outer annular surface 46 of the repeller chamber 44 defines a diameter D (FIG. 6). The forward surface 50 and rearward surface 48 of the repeller chamber 44 define an axial length B (FIG. 2).

Figure 3:
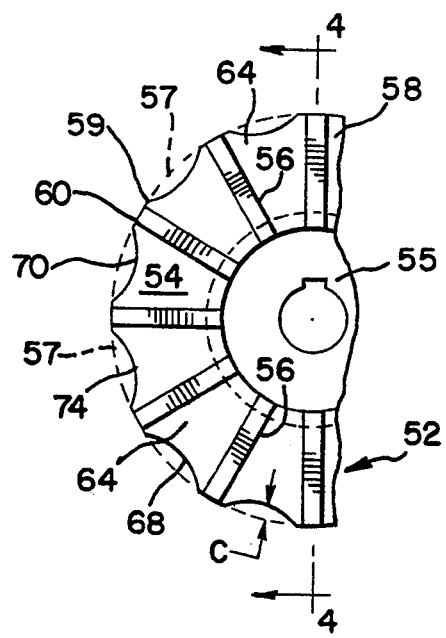
FIG. 3 is a partial front elevational view of the repeller of the present invention, illustrating the scalloped outer circumferential surface and vanes of the repeller.
Figure 4:
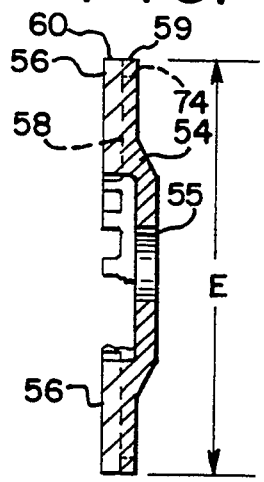
FIG. 4 is a side cross-sectional view of the impeller of FIG. 2, taken along line 4—4.

Fixedly attached to the rotary shaft 16 and disposed for rotation within the repeller chamber 44 is a repeller 52. The repeller 52 prevents fluid leakage rearward from the impeller cavity along the rotary shaft 16 and through a rearward aperture 53 formed by stuffing box 32 rearward of the repeller chamber 44. The repeller 52, shown in detail in FIGS. 3 and 4, has a forward disk-like member 54 having a central hub 55, an outer circumferential surface 59 and an outermost diametrical extent 57 which defines an outermost repeller diameter dimension E (FIG. 4). The distance between the circumferential surface 59 and the annular surface 46 of repeller chamber 44 defines a clearance F (FIG. 2).

The repeller 52 has a plurality of radially extending vanes 56 integrally connected to a rearward face 58. Each of the vanes 56 extend radially outward along the rearward face 58 of the repeller 52 generally to the extent 57 and include an outer radial edge 60 which is generally parallel to the longitudinal axis 18. To prevent uneven radial loading on the rotary shaft 16 from the rotating repeller 52, the preferred embodiment of the repeller 52 includes an even number of vanes 56, evenly radially spaced about the rearward face 58 of disk 54.

The disk 54 includes a plurality of web portions 64 extending between adjacent vanes 56. Each of the web portions 64 of the disk 52 include outer radial edges 68 which form a scallop like indentation 70. The scallop 70 is generally concavely shaped and curved radially inward from the outermost extent 57 of the repeller 52. The scallop 70 has a centerpoint 74 defining a radial depth C from the outermost extent 59. The radial depth C (FIG. 3) is in the range of 1.0% to 10.0% and preferably within the range of 3.0% to 4.0% of the outermost repeller diameter E to create shear forces within the fluid vortex in the repeller chamber.

Figure 5:
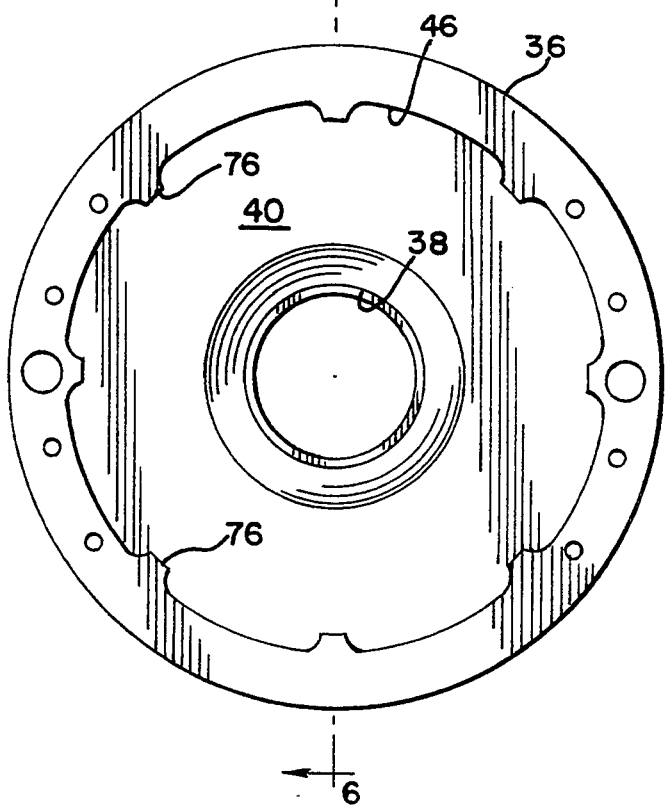
FIG. 5 is a front elevational view of the backplate forming one side of the repeller chamber of the present invention, showing the lateral surface of the backplate which faces the repeller.
Figure 7:
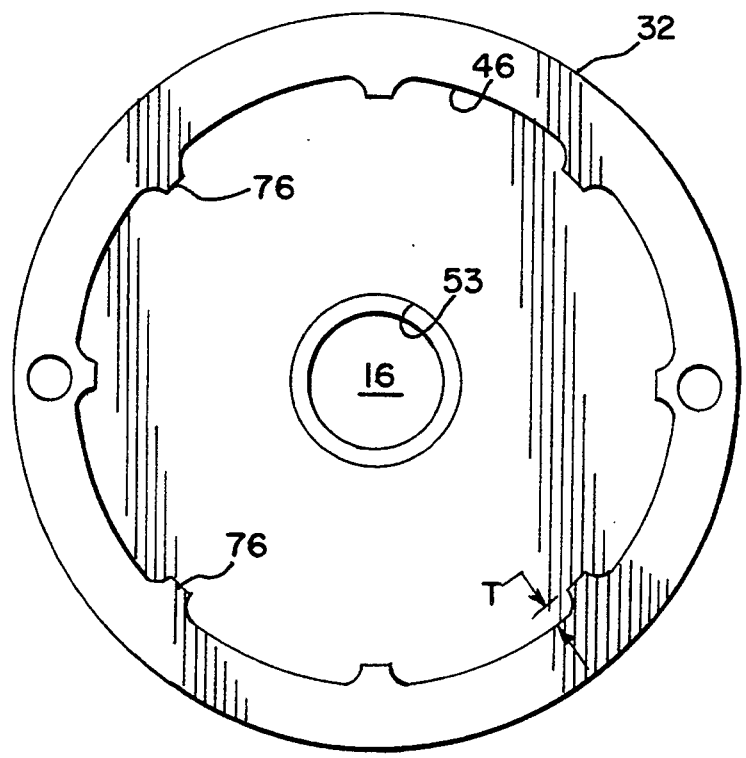
FIG. 7 is a front elevational view of the stuffing box cover of the pump apparatus, illustrating the lateral surface of the stuffing box cover which faces the repeller.

Referring to FIGS. 5 and 6, a plurality of stationary or fixed radially extending vanes 76 are formed in backplate 36 and in stuffing box 32 (FIG. 7), both of which elements form the outer annular surface 46 of repeller chamber 44. The stationary vanes 76 extend radially inward from the annular surface for a clearance T (FIGS. 7 and 8) which ranges from 1.0% to 10.0% of the outermost diameter E. In the preferred embodiment, eight or ten vanes 76 are equally spaced around the circumference of annular surface 46 of the repeller chamber 44. The clearance distance between the outer extent 59 of the repeller 52 and the inward extent of stationary vanes 76 is in the range of 0.5% to 5.0% and preferably 1.0% of the outermost diameter E (FIG. 4).

In operation the motor 20 of the pump 10 is activated, which creates a rotation of the rotary shaft 16 about the longitudinal axis 18. The rotating shaft 16 creates a corresponding rotation of the impeller 12 and repeller 52. Slurry fluid enters the impeller cavity 28 at the center of the impeller 12. The fluid is pressurized and displaced radially outward to the periphery of the impeller cavity 28 by the action of the impeller 12. A portion of the pressurized fluid about the periphery flows radially inward between the impeller 12 and backplate 40 and enters the repeller chamber 44 through the forward aperture 38.

In the repeller chamber 44, the fluid contacts the disk 54 of the rotating repeller 52. The centrifugal force or viscous pumping action applied by the disk 54 drives the fluid radially outward between the disk and backplate 36 chamber 52 to the annular clearance F.

The fluid then migrates radially inward through the rotating vanes 56. The centrifugal force or pumping action of the rotating vanes 56 on the fluid creates presure which prevents the fluid from flowing radially inward through the vanes to the shaft 16. The fluid migrates radially inward along the vanes 56 to a point where a slurry/atmospheric pressure interface is formed.

The pumping action of the disk 54 and vanes 56 on the fibrous slurry creates a forced vortex in the fluid. Centrifugal forces within the vortex and the specific gravity of the dispersed fiber will generally cause the fibers to settle out of the slurry or clot unless a mixing agitation is supplied to the fluid. Shear forces and circulatory flows are created within the vortex by the present invention. The shear forces and circulatory flow mixes the fluid slurry within the vortex. The mixing action maintains the fibers in dispersion.

As the repeller rotates, the scallops on the circumferential edge of the disk cause the clearance between the disk 54 and the stationary vanes 76 and annular surface 46 to constantly vary. The varying clearance between the stationary vanes 76 and the outer circumferential edge 59 of the repeller 52 ranges from 0.5% to 5.0% of the diametrical dimension E of the repeller when the stationary vanes 76 are aligned with the rotary vanes 56, to a range of 1.5% to 15.0% of the diametrical dimension E when the stationary vanes are aligned with the centerpoint 74 of a scallop 70. Shear forces are created by the constantly varying clearance between the scallops 70 and stationary vanes 76 and between the scallops and annular surface 46 of the repeller chamber 44.

The action of the rotating vanes 56 as the vanes travel past the stationary vanes 76 also creates shear forces. The clearance between the outer edge 60 of the rotating vanes 56 and the stationary vanes 76 may range from 0.5% to 5.0% of the outermost diametrical diameter E.

Figure 8:
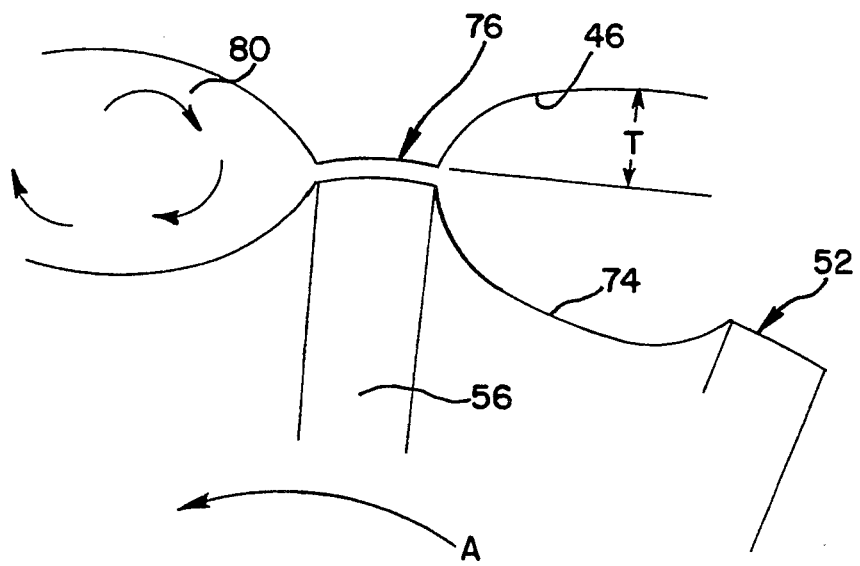
FIG. 8 is a schematic illustration of the formation of zones of recirculation formed between the repeller and the annular surface of the repeller chamber.

Referring to FIG. 8, the clearance T between the inner surface of the stationary vanes 76 and the annular surface 46 of the repeller chamber 44 allows the action of the rotating repeller 52 to form zones 80 of circulation about the stationary vanes and cause acceleration of the fluid upstream of the stationary vanes.

The shear forces created by the stationary vanes 76 in combination with the elements of the rotating repeller 52, the scallops 70 and the circulation zones 80 causes mixing of the fluid within the otherwise uniform vortex. The mixing maintains the dispersion of the fibrous material in the slurry. Maintaining the dispersion of the fibrous material prevents clotting of the material in the repeller chamber and about the repeller.

A specific embodiment of a novel dynamic shaft seal for pumping fibrous slurries has been described for the purpose of illustrating the manner in which the invention may be used and made. It should be understood that the implementation of other variations and modifications of the invention in its various aspects will be apparent to those skilled in the art, and that the invention is not limited by the specific embodiment described. It is therefore contemplated to cover by the present invention any and all modifications, variations or equivalents that fall within the spirit and scope of the basic invention disclosed and claimed herein.

What is claimed is:

1. A dynamic shaft seal device for a fluid handling apparatus for pumping fibrous slurries, the fluid handling apparatus comprising an impeller mounted on a rotating shaft disposed in a pump housing, the shaft extending through an aperture extending from the pump housing into an impeller casing forming part of the pump housing, prime mover means adapted to rotate the shaft and the impeller, a slurry of a dispersed fibrous material in a fluid disposed in the impeller casing, a repeller chamber formed in the pump housing and in communication with the impeller casing, the repeller chamber having an outer annular surface, the repeller chamber located in proximity to the aperture, a repeller attached for rotation with the shaft, the repeller extending into the repeller chamber to force a portion of the fluid in the impeller casing to move in a vortex in a direction away from the aperture, means associated with the repeller to apply shear forces to the fluid vortex, and create circulatory flow within the vortex to maintain the dispersion of the fibrous material in the slurry, the means including an outer circumferential surface on the repeller, and scalloped indentations formed in the outer circumferential surface of the repeller, the repeller including a plurality of radially extending vanes on one face of the repeller, and each scalloped indentation extends between two adjacent vanes.

2. The dynamic shaft seal of claim 1 wherein the linear depth of each scalloped indentation measured from the outermost diametrical extent of the repeller is in the range of 1.0% to 10.0% of the outermost diametrical dimension of the repeller.

3. The device of claim 1 wherein the scalloped indentations are concavely shaped.

4. A dynamic shaft seal device for a fluid handling apparatus for pumping fibrous slurries, the fluid handling apparatus comprising an impeller mounted on a rotating shaft disposed in a pump housing, the shaft extending through an aperture extending from the pump housing into an impeller casing forming part of the pump housing, prime mover means adapted to rotate the shaft and the impeller, a slurry of a dispersed fibrous material in a fluid disposed in the impeller casing, a repeller chamber formed in the pump housing and in communication with the impeller casing, the repeller chamber being generally sealed from the introduction of a flushing fluid into the outer circumferential portion of the chamber, the repeller chamber located in proximity to the aperture, a repeller attached for rotation with the shaft, the repeller extending into the repeller chamber to force a portion of the fluid in the impeller casing to move in a vortex in a direction away from the aperture, means associated with the repeller to apply shear forces to the fluid vortex, and create circulatory flow within the vortex to maintain the dispersion of the fibrous material in the slurry, the means including fixed vanes extending radially inward from the annular surface of the repeller chamber and rotary vanes mounted on the repeller, said rotary vanes having outer surfaces which pass closely adjacent the inner surfaces of the fixed vanes to provide a zone of recirculation in the fluid disposed between the repeller and the annular surface of the repeller chamber as the repeller rotates.

5. The dynamic shaft seal of claim 4 wherein a clearance is provided between the outer surfaces of the rotary vanes and the inner surfaces of the fixed vanes, which clearance is in the range of 0.5% to 5.0% of the outermost diametrical dimension of the repeller.

6. The dynamic shaft seal of claim 5 wherein the clearance between the outer surfaces of the rotary vanes and the inner surfaces of the fixed vanes is 2.0% of the outermost diametrical dimension of the repeller.

7. The dynamic shaft seal of claim 4 wherein the clearance between the annular circumferential surface of the repeller chamber and the inner surfaces of the fixed vanes is in the range of 1.0% to 10.0% of the outermost diametrical dimension of the repeller.

8. The dynamic shaft seal of claim 4 wherein as the repeller rotates in the repeller chamber, the clearance between the inner surfaces of the fixed vanes and the outer circumferential edge of the repeller constantly changes from a range of 0.5% to 5.0% of the diametrical dimension of the repeller when the stationary vanes are aligned with the rotary vanes, to a range of 1.5% to 15.0% of the diametrical dimension of the repeller when the stationary vanes are aligned with a centerpoint of one of a plurality of scalloped indentations formed in the outer circumferential surface of the repeller, the scalloped indentations disposed between said rotary vanes.

9. The device of claim 4 wherein the fixed vanes are generally evenly distributed about the circumference of the annular surface of the repeller chamber.

10. The device of claim 4 wherein the number of fixed vanes ranges from 8 to 10.

* * * * *